United States Patent
Jin (10) Patent No.: US 10,025,025 B2
(45) Date of Patent: Jul. 17, 2018

(54) LIQUID CRYSTAL DISPLAY DEVICE

(71) Applicant: LG Display Co., Ltd., Seoul (KR)

(72) Inventor: JaeHyun Jin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 80 days.

(21) Appl. No.: 15/197,680

(22) Filed: Jun. 29, 2016

(65) Prior Publication Data

US 2017/0184781 A1   Jun. 29, 2017

(30) Foreign Application Priority Data

Dec. 23, 2015   (KR) .................. 10-2015-0185149

(51) Int. Cl.
   *F21V 8/00*    (2006.01)
   *G02F 1/1333*   (2006.01)

(52) U.S. Cl.
   CPC ........... *G02B 6/0088* (2013.01); *G02B 6/005* (2013.01); *G02B 6/0055* (2013.01); *G02F 1/133308* (2013.01); *G02F 2201/465* (2013.01); *G02F 2201/503* (2013.01)

(58) Field of Classification Search
   CPC ... G02F 1/133308; G02F 2001/133314; G02F 2001/133317; G02F 2201/465; G02F 2201/503; G02F 2201/54; G02B 6/0055; G02B 6/0088; G02B 6/005
   See application file for complete search history.

(56) References Cited

U.S. PATENT DOCUMENTS

| | | | |
|---|---|---|---|
| 2007/0002206 A1* | 1/2007 | Shirai | G02F 1/133308 349/58 |
| 2008/0273138 A1* | 11/2008 | Lee | B29C 45/14344 349/58 |
| 2010/0201906 A1* | 8/2010 | Fukayama | G02F 1/133308 349/58 |
| 2011/0032447 A1* | 2/2011 | Park | G02B 6/0068 349/58 |
| 2013/0070475 A1* | 3/2013 | Youk | G02B 5/0242 362/602 |
| 2013/0321293 A1* | 12/2013 | Park | G06F 3/041 345/173 |
| 2014/0132880 A1* | 5/2014 | Zhao | G02F 1/133308 349/58 |
| 2014/0333844 A1* | 11/2014 | Ito | H04N 5/64 348/794 |

* cited by examiner

*Primary Examiner* — Jia Pan
(74) *Attorney, Agent, or Firm* — Fenwick & West LLP (57) ABSTRACT

A liquid crystal display device includes a liquid crystal display panel, a backlight unit under the liquid crystal display panel, and a guide panel surrounding the backlight unit. The guide panel includes a metal chassis, a first mold, and a second mold. The metal chassis has a plate shape, includes a plurality of through holes, and is formed of a metal material. The first mold is on at least a part of an upper surface and a lateral surface of the metal chassis and within the through holes and is formed of a light absorbing resin. The second mold is between the first mold and the backlight unit and is formed of a light reflecting resin.

13 Claims, 8 Drawing Sheets

LIQUID CRYSTAL DISPLAY DEVICE

CROSS-REFERENCE TO RELATED APPLICATIONS

This application claims the priority of Republic of Korea Patent Application No. 10-2015-0185149, filed on Dec. 23, 2015 in the Korean Intellectual Property Office, the disclosure of which is incorporated herein by reference.

BACKGROUND

Field of the Disclosure

The present disclosure relates to a liquid crystal display device and more particularly to a liquid crystal display device capable of suppressing light leakage and reducing torsion of a guide panel.

Description of the Related Art

A liquid crystal display (LCD) device is a display device for displaying an image by controlling the transmissivity of light generated from a light source. In the LCD device, the light source is disposed under a liquid crystal and an electric field is applied to the liquid crystal to control alignment of the liquid crystal. The LCD device is included in various electronic devices such as a smartphone, and a tablet PC. A typical LCD device includes a backlight unit including a light source, a liquid crystal display panel disposed on the backlight unit, and a guide panel disposed to surround the backlight unit.

One example backlight unit includes a light emission assembly, a light guide plate, and an optical sheet. The optical sheet is disposed between the liquid crystal panel and the light guide plate. The light emission assembly is disposed on a lateral surface of the light guide plate. Thus, light is diffused through the light guide plate. A reflecting plate on a back surface of the light guide plate reflects incident light from the back surface of the light guide plate.

The guide panel surrounds the backlight unit. The guide panel reflects or absorbs light emitted from the light guide plate of the backlight unit to a lateral surface of the backlight unit and thus reduces the amount of emitted light. That is, the guide panel reduces light leakage from the backlight unit. Herein, the guide panel is manufactured using plastic which can reflect or absorb light. The guide panel supports the optical sheet, the light guide plate, the light emission assembly, and the reflecting plate and also guides the backlight unit onto the liquid crystal display panel.

Recently, liquid crystal display devices having increased degrees of freedom and including a narrow bezel have been designed. The narrow bezel is manufactured by forming an active area as wide as possible and a bezel area, which is an inactive area, as narrow as possible.

As the size of the bezel area is decreased, the thickness or width of the guide panel formed to surround a lateral surface and a lower part of the backlight unit is also decreased. In this case, due to the decrease in thickness of a lateral surface of the guide panel, the guide panel is likely to be bent after injection. That is, a guide panel that does not have a sufficient thickness is easily bent even by a small force and has greatly reduced stiffness.

Overall, present liquid crystal display devices include guide panels that are easily bent by a small force and that have insufficient stiffness.

SUMMARY

The present disclosure describes a liquid crystal display device having a structure that improves resistance to bending caused by an external force in order to improve the stiffness and reduce bending of guide panels having decreased thickness to provide decreased bezel area.

The present disclosure provides a liquid crystal display device having a guide panel that includes a first mold and a second mold to suppress light leakage. The guide panel includes a metal chassis combined with a plurality of areas of the first mold to increase resistance to bending of the first mold and the second mold. Thus, the stiffness of the guide panel can be increased.

The advantages and benefits of the present disclosure are not limited to those described above and other advantages and benefits, which are not mentioned above, will be apparent to a person having ordinary skill in the art from the following description.

According to an aspect of the present disclosure, a liquid crystal display device includes a liquid crystal display panel, a backlight unit under the liquid crystal display panel, and a guide panel surrounding the backlight unit. The guide panel includes a metal chassis, a first mold, and a second mold. The metal chassis has a plate shape and includes a plurality of through holes. The first mold is disposed on at least a part of an upper surface of the metal chassis and a lateral surface of the metal chassis and within the plurality of through holes and formed of a light absorbing resin. The second mold is disposed between the first mold and the backlight unit and formed of a light reflecting resin. In the liquid crystal display device according to an embodiment of the present disclosure, the first mold is combined with at least the part of the upper surface of the metal chassis including the through holes, the lateral surface of the metal chassis, and the through holes. The metal chassis is formed of a metal material and thus has a sufficient stiffness. Therefore, the first mold or the second mold on the first mold may have increased resistance to bending or torsion.

According to another aspect of the present disclosure, a liquid crystal display device includes a liquid crystal display panel, a backlight unit under the liquid crystal display panel, and a guide panel surrounding the backlight unit. The guide panel includes a first mold that covers the backlight unit and that absorbs light as well as a second mold between the first mold and the backlight unit. The second mold reflects light. Further, the guide panel includes a metal chassis combined with the first mold and supporting the first mold so as to suppress bending or torsion of the first mold and the second mold.

Details of other embodiments will be included in the detailed description of the disclosure and the accompanying drawings.

According to an aspect of the present disclosure, a guide panel includes a first mold, a second mold, and a metal chassis combined with a plurality of areas of the first mold. Thus, it is possible to manufacture a liquid crystal display device including the guide panel which can suppress light leakage from a backlight unit and has a sufficient stiffness to reduce bending or torsion.

According to an aspect of the present disclosure, the guide panel includes a light absorbing resin that blocks a light leakage path. Therefore, light leakage may be suppressed.

According to an aspect of the present disclosure, the guide panel includes a light reflecting resin that increases the light efficiency. Therefore, the brightness may be improved.

The effects of the present disclosure are not limited to the aforementioned effects, and various other effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Advantages and features of the present disclosure, and methods for accomplishing the same will be more clearly understood from embodiments described below with reference to the accompanying drawings. However, the present disclosure is not limited to the following embodiments but may be implemented in various different forms. The embodiments are provided only to illustrate examples of the present disclosure to facilitate understanding by a person having ordinary skill in the art. The scope of the invention is defined by the appended claims.

The shapes, sizes, ratios, angles, numbers, and the like illustrated in the accompanying drawings for describing the embodiments of the present disclosure are merely examples, and the present disclosure is not limited thereto. Further, in the following description, a detailed explanation of known related technologies may be omitted to avoid unnecessarily obscuring the subject matter of the present disclosure. Terms such as "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the terms "immediately" or "directly."

When an element or layer is referred to as being "on" another element or layer, it may be directly on the other element or layer, or intervening elements or layers may be present.

Although the terms "first," "second," and the like are used for describing various components, these components are not confined by these terms. These terms are merely used for distinguishing one component from the other components. Therefore, a first component to be mentioned below may be a second component in another embodiment of the present disclosure.

Throughout the specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in various ways as can be fully understood by a person having ordinary skill in the art, and the embodiments can be carried out independently of or in association with each other.

Hereinafter, various embodiments of the present disclosure will be described in detail with reference to the accompanying drawings.

Figure 1:
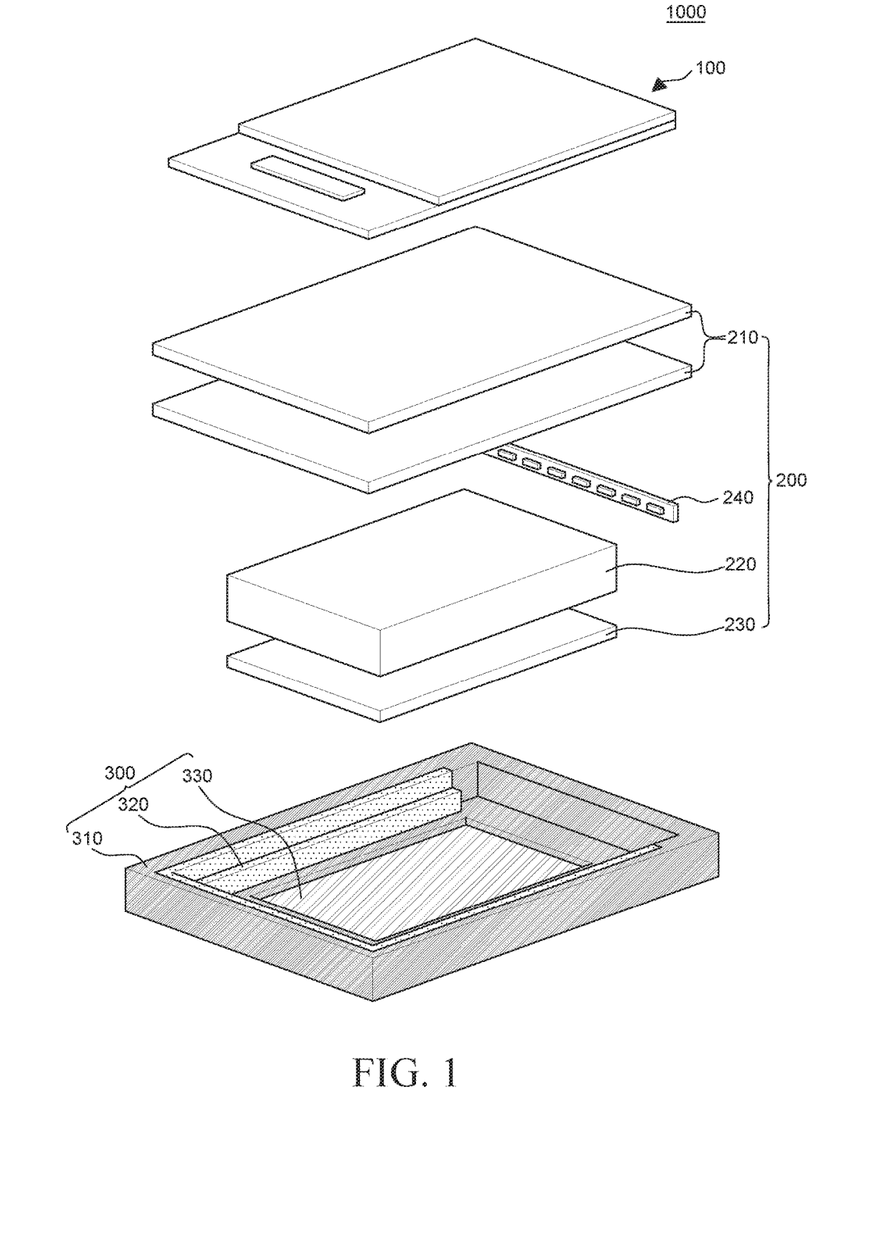
FIG. 1 is a schematic exploded perspective view of a liquid crystal display device according to an embodiment of the present disclosure.

FIG. 1 is a schematic exploded perspective view of a liquid crystal display device 1000 according to an embodiment of the present disclosure. A liquid crystal display device 1000 illustrated in FIG. 1 includes a liquid crystal display panel 100, a backlight unit 200, and a guide panel 300.

The guide panel 300 supports the liquid crystal display panel 100 and the backlight unit 200. The guide panel 300 surrounds the backlight unit 200. Thus, the backlight unit 200 is accommodated in the guide panel 300. Further, the guide panel 300 and the liquid crystal display panel 100 may be bonded to each other with an adhesive tape, as described in further detail with reference to FIG. 3.

The guide panel 300 includes a first mold 310, a second mold 320, and a metal chassis 330. The metal chassis 330 may be formed of a metal having a sufficient stiffness. The first mold 310 is disposed to surround a lateral surface of the metal chassis 330. The first mold 310 may be formed of a light absorbing resin that absorbs light. The second mold 320 may be disposed inside the first mold 310. The second mold 320 may be formed of a light reflecting resin that reflects light. The above-described components of the guide panel 300 will be described in further detail with reference to FIG. 2 and FIG. 3.

The backlight unit 200 is accommodated in the guide panel 300. The backlight unit 200 emits light to the liquid crystal display panel 100. The backlight unit 200 includes an optical sheet 210, a light guide plate 220, a reflecting plate 230, and a light emission assembly 240.

The light emission assembly 240 is configured to generate light and may include a light emission diode (LED) and a driving circuit that drives the LED, but is not limited thereto. The light emission assembly 240 may include a cold cathode fluorescent lamp (CCFL) or an external electrode fluorescent lamp (EEFL) instead of (or in addition to) the LED. Although FIG. 1 illustrates an edge-type light emission assembly 240, a direct-type light emission assembly 240 may be disposed to generate light.

The reflecting plate 230 reflects the light generated from the light emission assembly 240. The light reflected by the reflecting plate 230 may be incident into the liquid crystal display panel 100 through the light guide plate 220 and the optical sheet 210.

The light guide plate 220 diffuses or concentrates the light emitted from the light emission assembly 240 and guides the light to the liquid crystal display panel 100. The light guide plate 220 may have a flat-plate shape as illustrated in FIG. 1, or may have a wedge shape.

The optical sheet 210 is disposed on the light guide plate 220 and improves the brightness of the light generated from the light emission assembly 240. The optical sheet 210 may include a plurality of sheets including a diffusion sheet, a prism sheet, and a protection sheet.

The liquid crystal display panel 100 is disposed on the backlight unit 200. The liquid crystal display panel 100 displays an image by adjusting transmittance of the light emitted from the backlight unit 200.

Hereinafter, the guide panel 300 and various components disposed on the guide panel 300 of the liquid crystal display device 1000 will be described in more detail with reference to FIG. 2 and FIG. 3.

Figure 2:
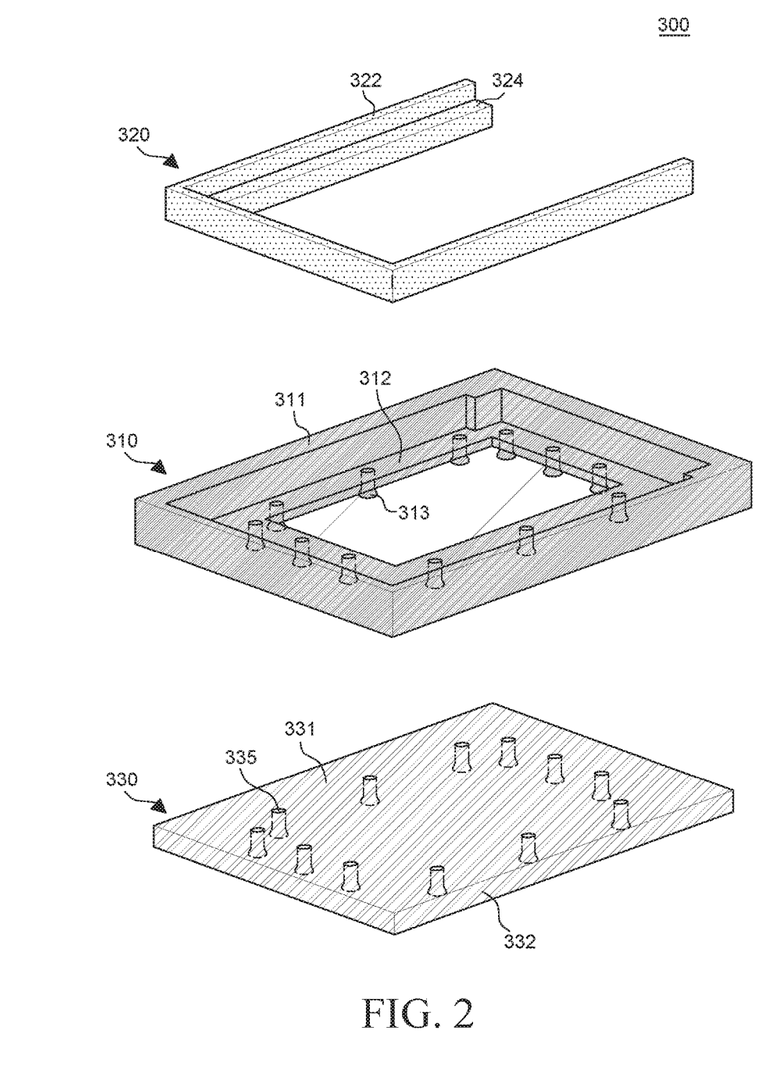
FIG. 2 is a schematic exploded perspective view of the guide panel illustrated in FIG. 1.

FIG. 2 is a schematic exploded perspective view of a guide panel 1000 illustrated in FIG. 1. FIG. 3 is a schematic cross-sectional view of the liquid crystal display device 1000 illustrated in FIG. 1. The liquid crystal display panel 100 and the backlight unit 200 illustrated in FIG. 3 are substantially the same as the liquid crystal display panel 100 and the backlight unit 200 illustrated in FIG. 1. Therefore, redundant explanation thereof will be omitted. Referring to FIG. 2 and FIG. 3, the backlight unit 200 is disposed under the liquid crystal display panel 100. The guide panel 300 is disposed under the liquid crystal display panel 100 so as to surround the backlight unit 200. For convenience in explanation, the liquid crystal display panel 100 will be described first.

Figure 3:
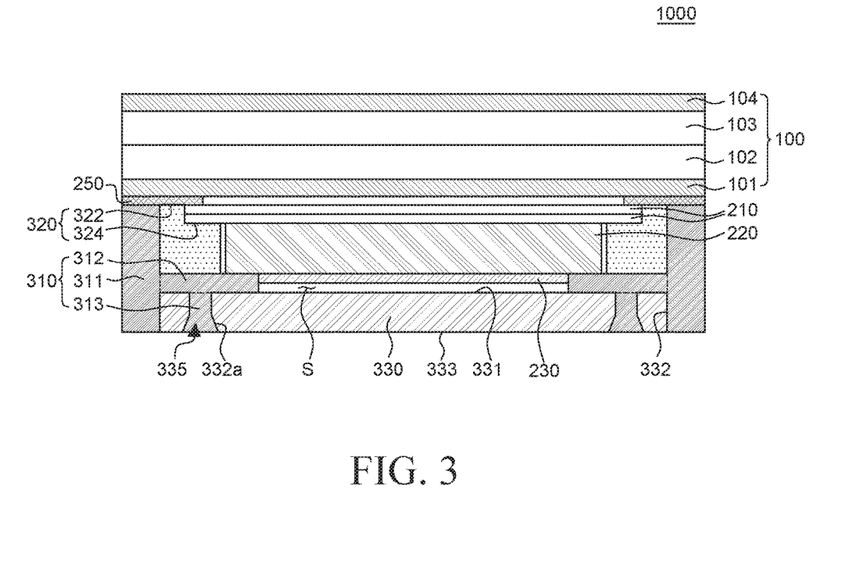
FIG. 3 is a schematic cross-sectional view of the liquid crystal display device illustrated in FIG. 1.

Referring to FIG. 3, the liquid crystal display panel 100 includes a lower polarizing plate 101, a lower substrate 102, a liquid crystal layer, an upper substrate 103, and an upper polarizing plate 104.

The lower polarizing plate 101 polarizes light emitted from the backlight unit 200. Specifically, the lower polarizing plate 101 polarizes light from the backlight unit 200 and then provides the polarized light to the liquid crystal layer.

The lower substrate 102 supports various components of the liquid crystal display panel 100. A thin film transistor (TFT), a pixel electrode electrically connected to the TFT, and a common electrode which may form an electric field with the pixel electrode may be disposed on the lower substrate 102. Thus, the lower substrate 102 may be referred to as a TFT substrate. The TFT may form an electric field between the pixel electrode and the common electrode on the basis of a driving signal transmitted through a line.

The upper substrate 103 is disposed to face the lower substrate 102. The upper substrate 103 is configured to support a color filter layer and thus may be referred to as a color filter substrate. The color filter layer selectively transmits light having a specific wavelength. A full-color image is displayed through the color filter layer. As described above, the common electrode may be disposed on the lower substrate 102. However, the pixel electrode may be disposed on the lower substrate 102 and the common electrode may be disposed on the upper substrate 103 depending on a driving method of the liquid crystal display panel 100.

The liquid crystal layer is disposed between the upper substrate 103 and the lower substrate 102. The liquid crystal layer is aligned in a certain direction by an alignment film in the upper substrate 103 or the lower substrate 102. The alignment of a liquid crystal may be changed on the basis of the electric field between the pixel electrode and the common electrode. The transmittance of the light emitted from the backlight unit 200 can be controlled by changing the alignment of the liquid crystal, and light penetrating the liquid crystal is emitted to the upper substrate 103.

The upper polarizing plate 104 polarizes light penetrating the upper substrate 103 and then emits the polarized light to above the upper polarizing plate 104.

The backlight unit 200 is disposed under the liquid crystal display panel 100 and accommodated in the guide panel 300. The backlight unit 200 supplies light to the liquid crystal display panel 100. The backlight unit 200 includes the optical sheet 210, the light guide plate 220, the reflecting plate 230, and the light emission assembly 240.

The guide panel 300 is disposed under the liquid crystal display panel 100. Further, the guide panel 300 is bonded to the liquid crystal display panel 100. Specifically, as illustrated in FIG. 3, the guide panel 300 and the liquid crystal display panel 100 are bonded to each other with an adhesive tape 250. The adhesive tape 250 is a double-sided tape and bonds the liquid crystal display panel 100 to the guide panel 300. Meanwhile, the adhesive tape 250 can be omitted depending on a design. Further, the guide panel 300 accommodates the backlight unit 200 in an inner space. Details of various components of the backlight unit 200 disposed in the inner space of the guide panel 300 will be described later.

The guide panel 300 includes the first mold 310, the second mold 320, and the metal chassis 330.

The metal chassis 330 has a plate shape and is formed of a metal. For example, the metal chassis 330 may be formed of one among aluminum (Al), iron (Fe), stainless steel (SUS), or alloys thereof, but is not limited thereto. The metal chassis 330 is formed of a metal and thus may have a sufficient stiffness. The metal chassis 330 is combined with the first mold 310, as will be described later. Herein, the metal chassis 330 is combined with the first mold 310 and supports the first mold 310 with a sufficient stiffness in order to suppress bending or torsion of the first mold 310 and the second mold 320.

Further, the metal chassis 330 includes a plurality of through holes 335. The through holes 335 are formed from an upper surface 331 of the metal chassis 330 to a lower surface 333 of the metal chassis 330. The plurality of through holes 335 is disposed to be adjacent to edges of the metal chassis 330. Each of the plurality of through holes 335 is disposed on a straight line along four edges of the metal chassis 330, but is not limited thereto. The plurality of through holes 335 may be disposed in various ways on the metal chassis 330. For example, the plurality of through holes 335 disposed along an edge may not be disposed on a straight line. Meanwhile, the metal chassis 330 has a thickness of around 0.3 mm, but is not limited thereto.

The through hole 335 includes sections respectively having different cross-sectional areas in an extension direction. Specifically, as illustrated in FIG. 3, in the through hole 335, a diameter uniformly decreases from an upper portion to a middle portion and then increases or remains constant from the middle portion to a lower portion. That is, an inner lateral surface of the through hole 335 has a slope shape 332a. In other words, the through hole 335 is formed into a wedge shape of which a diameter is gradually increased. Meanwhile, the first mold 310 fills the through hole 335 in such a wedge shape. However, the present disclosure is not limited thereto. The through hole 335 may include a portion having a cross-sectional area increases with distance from a protruded surface 312 of the first mold 310 in another portion instead of a lower end portion of the through hole 335. For example, the through hole 335 may include a portion in which a diameter increases up to a middle portion and a portion in which diameter decreases or is constant below the middle portion in a thickness direction of the metal chassis 330. Otherwise, the through hole 335 may be formed to have a diameter which gradually increases along the thickness direction of the metal chassis 330. Further, the metal chassis 330 may further include a through hole which is not combined with the first mold 310 and allows other components of the liquid crystal display device 1000 to pass therethrough.

The first mold 310 is formed of a light absorbing resin. For example, the first mold 310 may be formed of a black resin or a resin having a color similar to black. The first mold 310 functions to absorb light emitted from the light emission assembly 240 in order for light emitted from the light guide plate 220 not to leak to the outside of the guide panel 300. Accordingly, it is possible to reduce leakage of light emitted from the light guide plate 220 and penetrating the second mold 320 to the outside of the guide panel 300.

The first mold 310 is disposed to cover at least a part of the upper surface 331 of the metal chassis 330 and a lateral surface 332 of the metal chassis 330. Further, a portion of the first mold 310 covering the upper surface 331 of the metal chassis 330 is extended so as to be disposed within the through hole 335 of the metal chassis 330. The first mold 310 is combined with the metal chassis 330 such that at least three surfaces of the first mold 310 are in contact with the metal chassis 330. Details thereof will be described later.

The first mold 310 is configured to cover the lateral surface 332 of the metal chassis 330 along the edges of the metal chassis 330. Specifically, as illustrated in FIG. 2, the first mold 310 may be formed as a square or rectangular frame extended along the edges of the metal chassis 330. Meanwhile, an outer periphery of the first mold 310 may have an angled shape as illustrated in FIG. 3, or may have a rounded shape.

The first mold 310 includes a side wall 311, one or more protruded surfaces 312 and one or more extended parts 313 formed as one body.

The side wall 311 covers the lateral surface 332 of the metal chassis 330. Further, the side wall 311 is extended toward the liquid crystal display panel 100. The side wall 311 corresponds to a lateral part of the guide panel 300. An upper end surface of the side wall 311 is combined with the adhesive tape 250 that bonds the guide panel 300 to the liquid crystal display panel 100. Otherwise, the guide panel 300 and the liquid crystal display panel 100 may be bonded to each other with another means instead of the adhesive tape 250. For example, the liquid crystal display panel 100 and the guide panel 300 may be bonded to each other with an adhesive member formed to cover a part of a lateral surface of the liquid crystal display panel 100 and a part of a lateral surface of the guide panel 300. Meanwhile, the side wall 311 is disposed to be adjacent to the liquid crystal display panel 100, and functions as a buffer layer that absorbs a shock from the outside of the liquid crystal display panel 100. A height of the side wall 311 may be, for example, 1.05 mm, but is not limited thereto. The height of the side wall 311 may have a different value depending on the alignment and design of the internal components.

The protruded surface 312 protrudes from the side wall 311 to the inside of the guide panel 300. A lower surface of the protruded surface 312 is in contact with the upper surface 331 of the metal chassis 330. That is, the protruded surface 312 is disposed to cover at least a part of the upper surface 331 of the metal chassis 330. Specifically, as illustrated in FIG. 3, the protruded surface 312 covers the upper surface 331 of the metal chassis 330 and protrudes from the side wall 311. Further, the protruded surface 312 protrudes to cover the through hole 335. A thickness of the protruded surface 312 may be, for example, 0.2 mm, but is not limited thereto. The thickness of the protruded surface 312 may have a different value depending on the alignment and design of the internal components. The protruded surfaces 312 protrude inwardly from the side walls 311 disposed on opposing sides to face each other. A space is formed between the protruded surfaces 312 disposed on both sides. The reflecting plate 230 is disposed in the space between the protruded surfaces 312.

The extended part 313 is extended from one side of the protruded surface 312 to the through hole 335. As described above, the protruded surface 312 is disposed to cover the through hole 335, and, thus, the extended part 313 is disposed at a position of the protruded surface 312 corresponding to the through hole 335. The extended part 313 fills the inside of the through hole 335. Specifically, as illustrated in FIG. 3, the extended part 313 is formed corresponding to the internal shape of the through hole 335. That is, at a lower portion of the through hole 335 where a diameter is increases, a diameter of the extended part 313 increases accordingly.

In other words, the extended part 313 has a wedge shape with a wide lower portion in order to suppress removal of the first mold 310 from the metal chassis 330. Specifically, as illustrated in FIG. 3, a portion of the extended part 313 adjacent to the protruded surface 312 is extended with the same outer diameter as an inner diameter of the through hole 335. Then, the extended part 313 gradually increases in diameter as the extended part 313 extends along a longitudinal direction of the through hole 335. The wedge shape suppresses removal of the extended part 313 from the metal chassis 330.

The second mold 320 is formed of a light reflecting resin. For example, the second mold 320 may be formed of a white resin or a resin having a color similar to white. The second mold 320 is formed of a resin that reflects light emitted from the light guide plate 220 to be incident into the light guide plate 220. Specifically, referring to FIG. 3, the second mold 320 is disposed on a lateral surface of the light guide plate 220. Therefore, light emitted from the light emission assembly 240 and the light guide plate 220 may be reflected by the second mold 320 into the light guide plate 220. Accordingly, the second mold 320 can improve the brightness of light emitted from the backlight unit 200 and reduce light leakage.

The second mold 320 is disposed between the first mold 310 and the backlight unit 200. Specifically, as illustrated in FIG. 3, the second mold 320 is disposed to be in contact with the side wall 311 and the protruded surface 312. Further, the second mold 320 is disposed between the side wall 311 and the light guide plate 220 with the optical sheet 210. The second mold 320 has a width less than a protruded length of the protruded surface 312. That is, the protruded surface 312 protrudes farther than the second mold 320. Accordingly, a far end of the protruded surface 312 may be exposed and the light guide plate 220 may be disposed on the exposed far end of the protruded surface 312. Details thereof will be described later.

The second mold 320 is disposed to contact three surfaces of the first mold 310. Specifically, as illustrated in FIG. 2, the second mold 320 is disposed inside the first mold 310 so as to contact three surfaces (e.g., three side walls 311) of the first mold 310. As illustrated in FIG. 1, the liquid crystal display device 1000 illustrated in the present drawings is the edge-type liquid crystal display device 1000 in which the light emission assembly 240 is disposed on a lateral surface of the liquid crystal display panel 100. Herein, the light emission assembly 240 may be provided on one surface where the second mold 320 is not provided. Further, in a direct-type liquid crystal display device under which the light emission assembly 240 is disposed, the second mold 320 may be disposed to contact four surfaces (e.g., four side walls 311) of the first mold 310.

The second mold 320 includes a first surface 322 and a second surface 324 which form a stepped portion. The stepped portion is formed from the side wall 311 to the inside of the guide panel 300. The first surface 322 is a higher surface and the second surface 324 is a lower surface. That is, the second mold 320 has a step shape. Specifically, as illustrated in FIG. 3, the first surface 322 is in contact with the side wall 311 and has the same level as an upper surface of the side wall 311. That is, the upper surface of the side wall 311 and the first surface 322 may be disposed on the same plane. The adhesive tape 250 that bonds the liquid crystal display panel 1000 as described above to the guide panel 300 is attached to the first surface 322. A height of the first surface 322 may be, for example, 0.55 mm, but is not limited thereto. The height of the first surface 322 may have a different value depending on the alignment and design of the internal components.

The second surface 324 is separated from the side wall 311 and disposed at a lower level than the first surface 322. Specifically, as illustrated in FIG. 3, the second surface 324 has a smaller height than the first surface 322 and is disposed inside the guide panel 300. A plurality of optical sheets 210 is disposed on the second surface 324.

Hereinafter, the alignment of the components of the backlight unit 200 on the guide panel 300 will be explained. The backlight unit 200 includes the optical sheet 210, the light guide plate 220, and the reflecting plate 230.

The reflecting plate 230 is disposed between the protruded surfaces 312. Further, the reflecting plate 230 is disposed on the metal chassis 330. The reflecting plate 230 and the metal chassis 330 are disposed in separation from each other. Furthermore, a film printed circuit connected to the light emission assembly 240 may be disposed between the reflecting plate 230 and the metal chassis 330. The film printed circuit may be disposed under the reflecting plate 230 so as to support the reflecting plate 230. Also, an adhesive tape may be provided between the reflecting plate 230 and the light guide plate 220, so that the reflecting plate 230 and the light guide plate 220 may be bonded to each other.

As described above, the reflecting plate 230 is disposed in separation from the metal chassis 330. Another sensor printed circuit board may be disposed in a separation space S. Otherwise, the protruded surfaces 312 may be extended to fill the separation space S in order not to form the separation space S. Specifically, the protruded surfaces 312 may be extended to below the reflecting plate 230 while forming a stepped portion in order to fill the space under the reflecting plate 230.

The light guide plate 220 is disposed on the reflecting plate 230. Further, the light guide plate 220 is disposed in contact with upper surfaces of the protruded surfaces 312. Specifically, as illustrated in FIG. 3, the light guide plate 220 may be disposed on the far surfaces of the protruded surfaces 312 protruding farther than the second mold 320. Since the protruded surfaces 312 are protruded from both sides of the metal chassis 330 so as to face each other, both ends of the light guide plate 220 may be supported by the protruded surfaces 312. Meanwhile, a thickness of the light guide plate 220 may correspond to a thickness of the second surface 324 of the second mold 320, but is not limited thereto.

The optical sheet 210 is disposed on the light guide plate 220. Further, the optical sheet 210 is disposed in contact with an upper portion of the second surface 324. Specifically, as illustrated in FIG. 2 and FIG. 3, the optical sheet 210 is disposed on the second surface 324 of the second mold 320. The second mold 320 is configured to contact at least three surfaces of the first mold 310. Therefore, the optical sheet 210 is in contact with the second surface 324 on the at least three surfaces as described above.

The liquid crystal display device 1000 according to an embodiment of the present disclosure includes the metal chassis 330 formed of a metal material. Further, the liquid crystal display device 1000 includes the first mold 310 filling the inside of the through hole 335 formed in the metal chassis 330 and combined with the metal chassis 330 and the second mold 320 disposed on the first mold 310. The first mold 310 and the second mold 320 respectively formed of resins have a small resistance to bending or torsion caused by an external force. The first mold 310 is disposed to cover a part of the upper surface 331 of the metal chassis 330 along four edges of the metal chassis 330, the lateral surface 332 of the metal chassis 330, and the inside of the through hole 335 of the metal chassis 330. Thus, the first mold 310 and the metal chassis 330 can be combined more securely. Thus, a resistance of the first mold 310 can be increased. Therefore, the metal chassis 330 formed of a metal material has a high resistance to bending or torsion caused by an external force, and, thus, the overall stiffness of the guide panel 300 is increased. Further, the first mold 310 and the second mold 320 have an increased resistance to bending or torsion. Furthermore, due to the improved stiffness of the guide panel 300, the guide panel 300 can safely protect the backlight unit 200 accommodated therein and the liquid crystal display panel 100 disposed thereon.

Further, in the liquid crystal display device 1000 according to an embodiment of the present disclosure, the protruded surface 312 of the first mold 310 is in wide contact with an upper portion of the metal chassis 330. Further, the extended portion 313 of the first mold 310 has a lower portion with a greater diameter. Thus, the first mold 310 is formed to grip the upper portion and a lower portion of the metal chassis 330. In this structure, the first mold 310 is combined securely with the metal chassis 330. That is, the protruded surface 312 and the extended part 313 suppress removal of the first mold 310 from the metal chassis 330.

Further, in the liquid crystal display device 1000 according to an embodiment of the present disclosure, the first mold 310 disposed outside is formed of the black resin and the second mold 320 disposed inside is formed of the white resin. Thus, light emitted from the light guide plate 220 is reflected, so that the brightness of the light can be increased. Further, the first mold 310 absorbs light penetrating the second mold 320, so that it is possible to reduce light leakage to the outside of the backlight unit 200.

FIG. 4A through FIG. 4E are schematic cross-sectional views of a manufacturing process of the guide panel 300 illustrated in FIG. 2 and FIG. 3. Hereinafter, a manufacturing method of the guide panel 300 illustrated in FIG. 1 through FIG. 3 will be described with reference to FIG. 4A through FIG. 4E. In the following, for convenience in explanation, redundant descriptions of the parts described above with reference to FIG. 1 through FIG. 3 will be omitted.

Figure 4A:
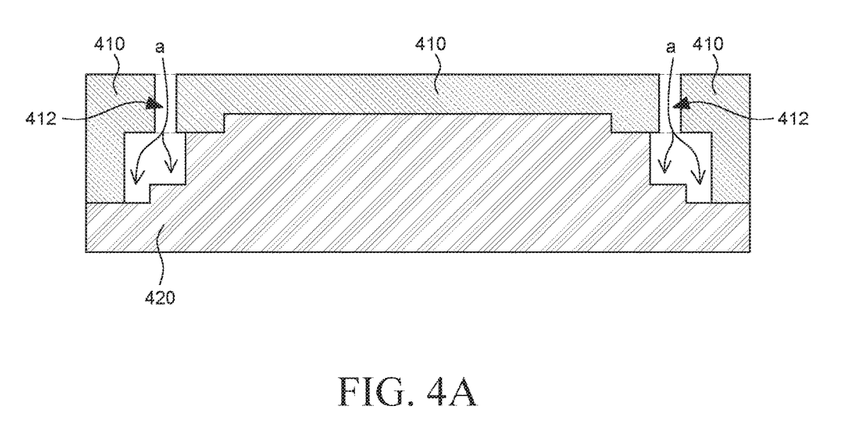
FIG. 4A, FIG. 4B, FIG. 4C, FIG. 4D, and FIG. 4E are schematic cross-sectional views of a manufacturing process of the guide panel illustrated in FIG. 2 and FIG. 3.

First, referring to FIG. 4A, a first die 410 corresponding to the shape of the second mold 320 and a second die 420 are respectively disposed opposite to each other to manufacture the second mold 320. A first die injection hole 412 for injecting a resin for manufacturing the second mold 320 is formed in an upper end of the first die 410.

A light reflecting resin, for example, a white resin, having viscosity and forming the second mold 320 is injected through the first die injection hole 412. The injected light reflecting resin having viscosity fills a space between the first die 410 and the second die 420 along a direction indicated by an arrow a.

Figure 4B:
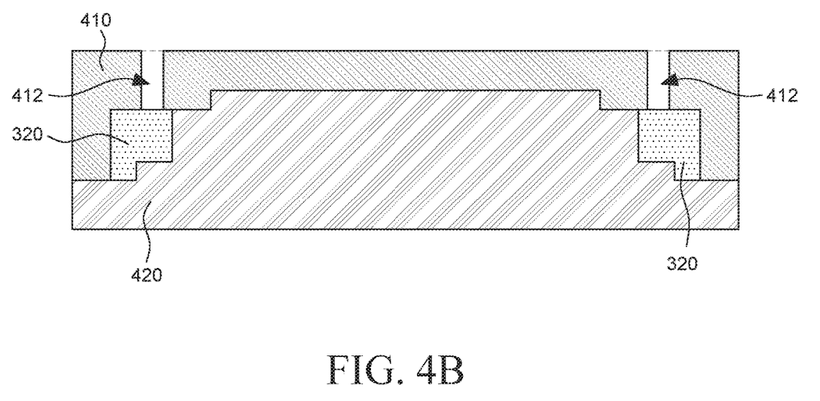

Then, referring to FIG. 4B, the light reflecting resin filling the space between the first die 410 and the second die 420 is cured so as to form the second mold 320 as time passes. If the second mold 320 is formed, the first die 410 may be removed.

Figure 4C:
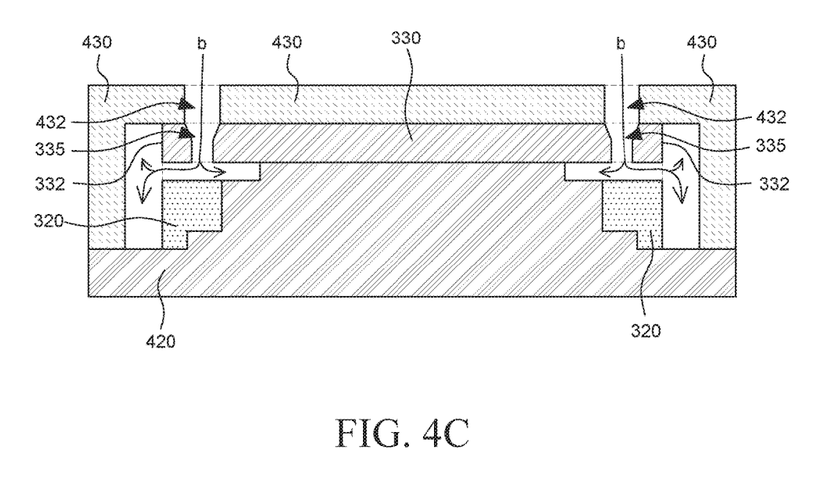

Referring to FIG. 4C, after the first die 410 is removed, the metal chassis 330 including the through hole 335 is disposed on an upper end of the second die 420. Then, a third die 430 corresponding to the shape of the first mold 310 is disposed on the upper end of the second die 420 so as to cover the metal chassis 330. A third die injection hole 432 for injecting a resin for manufacturing the first mold 310 is formed in an upper end of the third die 430. For example, the third die injection hole 432 may have a diameter smaller than or equal to that of the through hole 335 of the metal chassis 330.

A light absorbing resin, for example, a black resin, having viscosity and forming the first mold 310 is injected through the third die injection hole 432. The injected light absorbing resin having viscosity fills a space between the second die 420 and the third die 430 along a direction indicated by an arrow b. The light absorbing resin also fills the inside of the through hole 335 of the metal chassis 330.

Figure 4D:
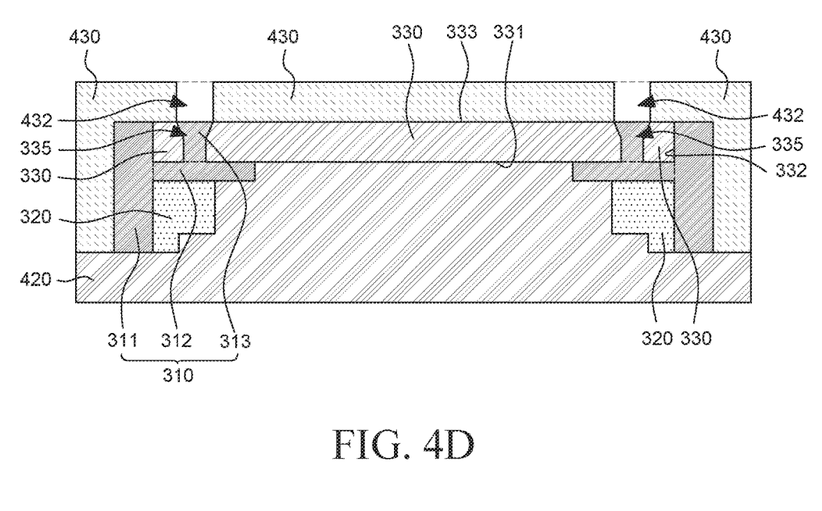

Then, referring to FIG. 4D, the first mold 310 filling the space between the second die 420 and the third die 430 is in contact with a plurality of surfaces of the metal chassis 330. Specifically, as illustrated in FIG. 4D, the first mold 310 is in contact with the lateral surface 332 of the metal chassis 330. Then, the first mold 310 is in contact with the upper surface 331 of the metal chassis 330 at an area corresponding to a portion where the protruded surface 312 is formed. Further, the first mold 310 is in contact with the metal chassis 330 within the through hole 335. On these contact surfaces, the first mold 310 is bonded to the metal chassis 330 during the curing process. Further, the first mold 310 is in contact with two surfaces of the second mold 320. While the first mold 310 having viscosity is hardened, the first mold 310 is brought into contact with the second mold 320. While being cured, the light absorbing resin is bonded to the metal chassis 330 and second mold 320 in contact with the light absorbing resin.

Figure 4E:
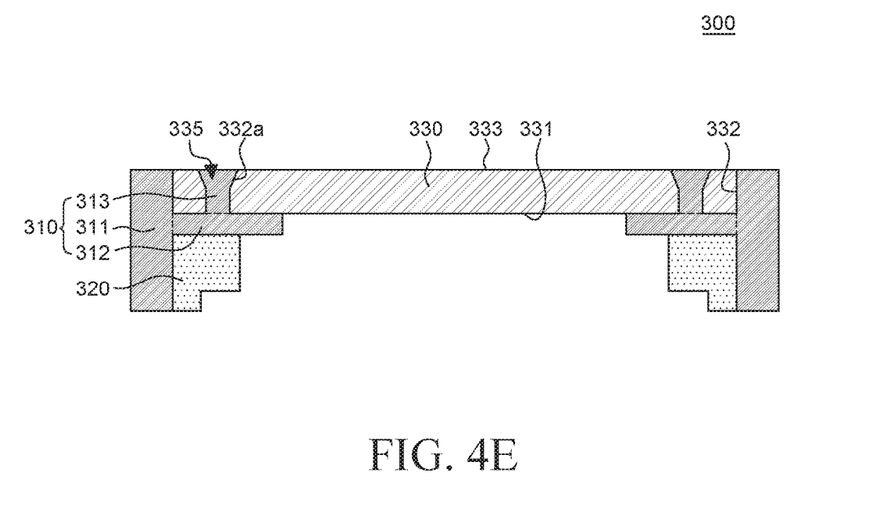

Then, referring to FIG. 4E, after the first mold 310 is cured, the second die 420 and the third die 430 are removed from the guide panel 300. The first mold 310 may be cured by cooling or heating. The guide panel 300 including the metal chassis 330 on the bottom may be inserted into the liquid crystal display device 1000. Further, the inner lateral surface of the through hole 335 has the slope shape 332a.

Meanwhile, after the first mold 310 is injected, the metal chassis 330 may be bent due to deformation of the metal chassis 330 depending on a difference in curing rate between areas and a temperature of the first mold 310 while the first mold 310 is cured. Herein, a flattening process may be further performed in order to flatten the metal chassis 330. Specifically, the flatness of the metal chassis 330 can be maintained by applying a pressure to the metal chassis 330 using a plurality of pressure probes having a matrix structure.

The embodiments of the present disclosure can also be described as follows:

According to an aspect of the present disclosure, a liquid crystal display device includes a liquid display panel, a backlight unit under the liquid crystal display panel, a guide panel surrounding the backlight unit. The guide panel includes a metal chassis, a first mold, and a second mold. The metal chassis has a plate shape and includes a plurality of through holes. The first mold is on at least a part of an upper surface and a lateral surface of the metal chassis and within the plurality of through holes and is formed of a light absorbing resin. The second mold is between the first mold and the backlight unit and is formed of a light reflecting resin. In the liquid crystal display device according to an embodiment of the present disclosure, the first mold is combined with at least the part of the upper surface of the metal chassis including the through holes, the lateral surface of the metal chassis, and the through holes. The metal chassis is formed of a metal material and thus has a sufficient stiffness. Therefore, the first mold or the second mold disposed on the first mold has increased resistance to bending or torsion.

The first mold may include a side wall corresponding to a lateral part of the guide panel, a plurality of protruded surfaces protruded from the side wall towards the inside of the guide panel, and an extended part extended from the protruded surfaces toward the plurality of through holes and filling the plurality of through holes.

The second mold may be in contact with the side wall and the protruded surfaces.

A width of the second mold may be less than a protruded length of the protruded surfaces.

The backlight unit may include a reflecting plate on the metal chassis, a light guide plate on the reflecting plate, and an optical sheet on the light guide plate. The reflecting plate may be disposed between the protruded surfaces.

The light guide plate may be on the protruded surfaces.

The through holes may include a portion having a cross-sectional area which increases away from the protruded surfaces.

The second mold may include a first surface and a second surface which forms a step. The first surface may be in contact with the side wall and may have the same level as an upper surface of the side wall. The second surface may be separated from the side wall and disposed at a lower level than the first surface.

The optical sheet of the backlight unit may be on an upper end of the second surface.

The second mold may be disposed to contact at least three surfaces of the first mold.

The light absorbing resin may include a black resin and the light reflecting resin may include a white resin.

According to another aspect of the present disclosure, a liquid crystal display device includes a liquid crystal display panel, a backlight unit under the liquid crystal display panel, a guide panel surrounding the backlight unit. The guide panel includes a first mold surrounding the backlight unit and configured to absorb light and a second mold between the first mold and the backlight unit. The second mold configured to reflect light. Further, the guide panel includes a metal chassis combined with the first mold and supporting the first mold so as to suppress bending or torsion of the first mold and the second mold.

The metal chassis includes a plurality of through holes. The first mold includes a protruded surface covering the through holes, and an extended part extended from the protruded surface to the through holes and filling the through holes. The extended part may have, at least in part, a wedge shape to suppress removal of the first mold from the metal chassis.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

What is claimed is:

1. A liquid crystal display device comprising:
a liquid crystal display panel;
a backlight unit under the liquid crystal display panel comprising a light guide plate and a reflecting plate under the light guide plate;
a guide panel surrounding the backlight unit, the guide panel including:
a metal chassis of a plate shape under the reflecting plate and formed with a plurality of through holes;
a first mold on at least a part of an upper surface of the metal chassis and a lateral surface of the metal chassis, the first mold having a plurality of extended parts filling the plurality of through holes, the first mold formed of a light absorbing resin; and
a second mold between the first mold and the light guide plate, the second mold formed of a light reflecting resin.

2. The liquid crystal display device according to claim 1, wherein the first mold includes:
a side wall corresponding to a lateral part of the guide panel; and
a plurality of protruded surfaces protruded from the side wall towards the inside of the guide panel, the plurality of extended parts extended from the protruded surfaces into the plurality of through holes and filling the plurality of through holes.

3. The liquid crystal display device according to claim 2, wherein the second mold is in contact with the side wall and the protruded surfaces.

4. The liquid crystal display device according to claim 3, wherein a width of the second mold is thinner than a protruded length of the protruded surfaces.

5. The liquid crystal display device according to claim 2, wherein the backlight unit includes:
an optical sheet on the light guide plate.

6. The liquid crystal display device according to claim 5, wherein the light guide plate is on the protruded surfaces.

7. The liquid crystal display device according to claim 2, wherein the through hole includes a portion having a cross-sectional area which increases away from the protruded surfaces.

8. The liquid crystal display device according to claim 2, wherein the second mold includes a first surface and a second surface which forms a step,
the first surface is in contact with the side wall and has a same level as an upper surface of the side wall, and
the second surface is separated from the side wall and is disposed at a lower level than the first surface.

9. The liquid crystal display device according to claim 8, wherein an optical sheet of the backlight unit is on an upper end of the second surface.

10. The liquid crystal display device according to claim 1, wherein the second mold contacts at least three surfaces of the first mold.

11. The liquid crystal display device according to claim 1, wherein the light absorbing resin includes a black resin and the light reflecting resin includes a white resin.

12. A liquid crystal display device comprising:
a liquid crystal display panel;
a backlight unit under the liquid crystal display panel comprising a reflecting plate reflecting light incident on the reflecting plate towards the liquid crystal display panel; and
a guide panel surrounding the backlight unit, the guide panel including:
a first mold surrounding the backlight unit and configured to absorb light, the first mold comprising side walls, and protruded surfaces protruding inwards from the side walls;
a second mold between the first mold and the backlight unit, the second mold configured to reflect light, a width of the second mold thinner than a protruded length of the protruded surfaces; and
a metal chassis combined with the first mold and supporting the first mold so as to suppress bending or torsion of the first mold and the second mold.

13. The liquid crystal display device according to claim 12, wherein the metal chassis includes a plurality of through holes,
the first mold comprises extended parts on the protruded surfaces that extend into the plurality of through holes.

* * * * *